United States Patent Office 3,794,468
Patented Feb. 26, 1974

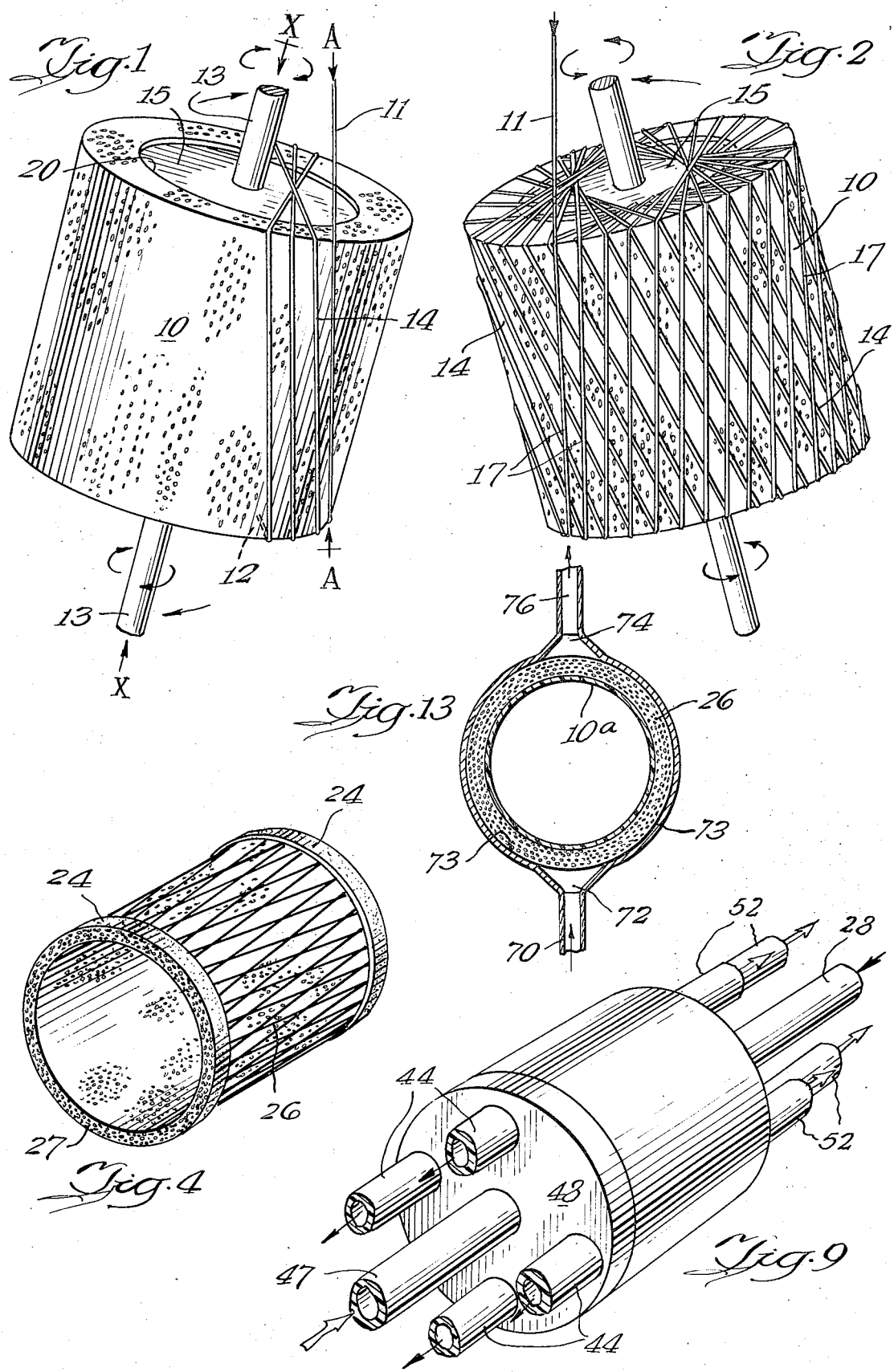

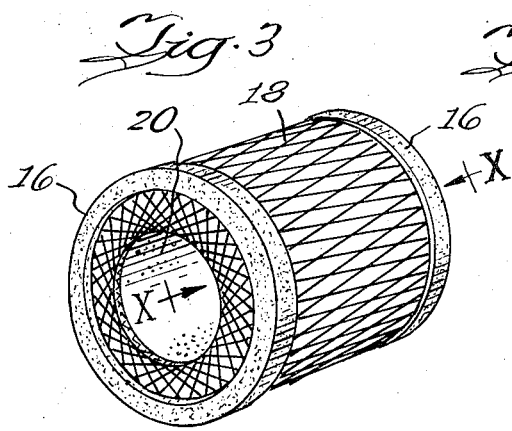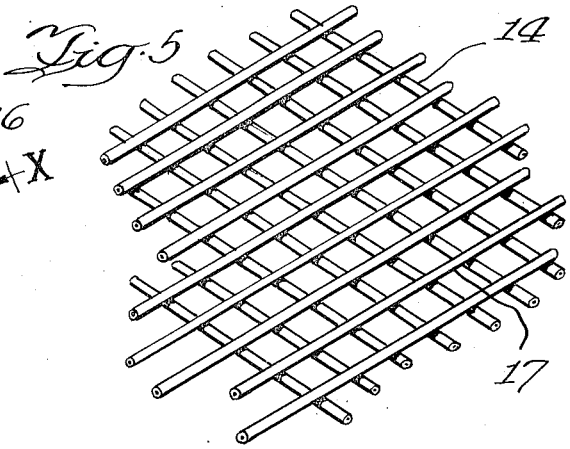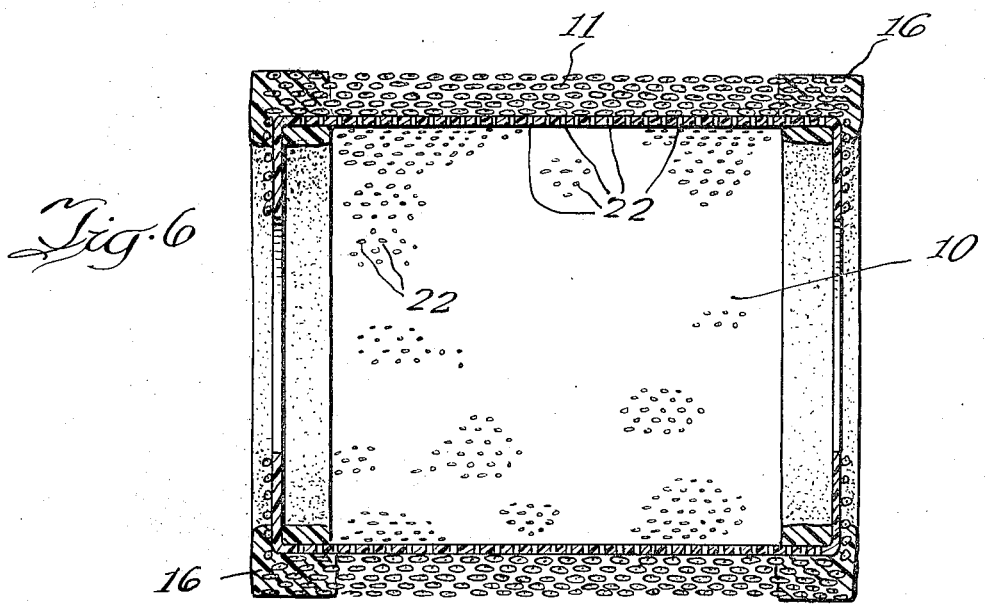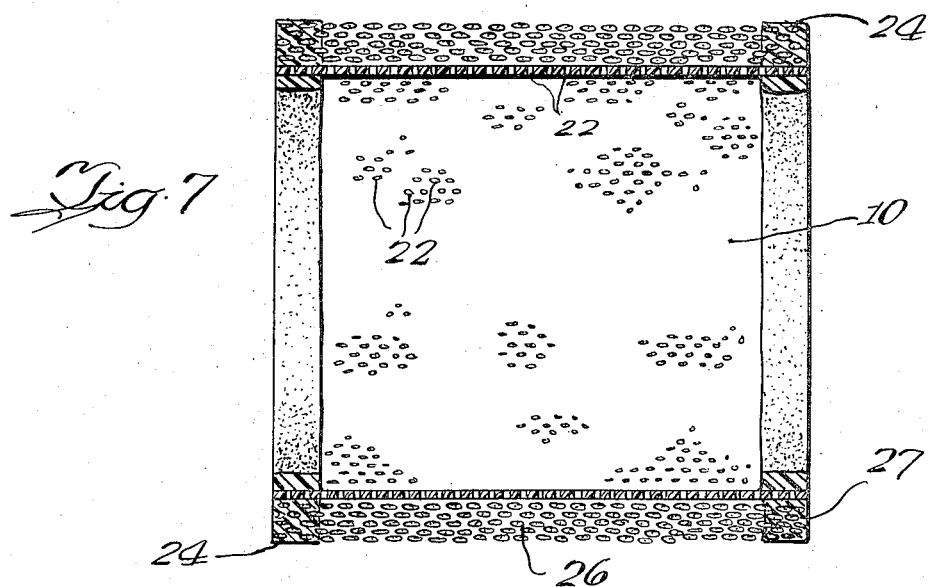

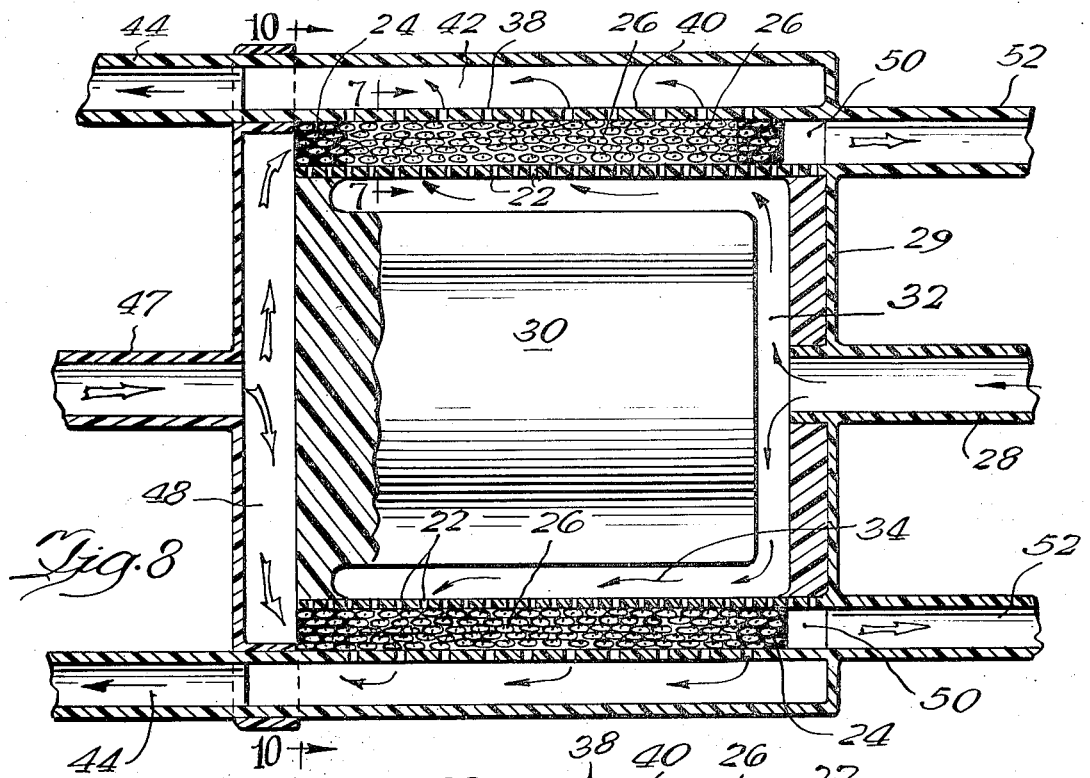
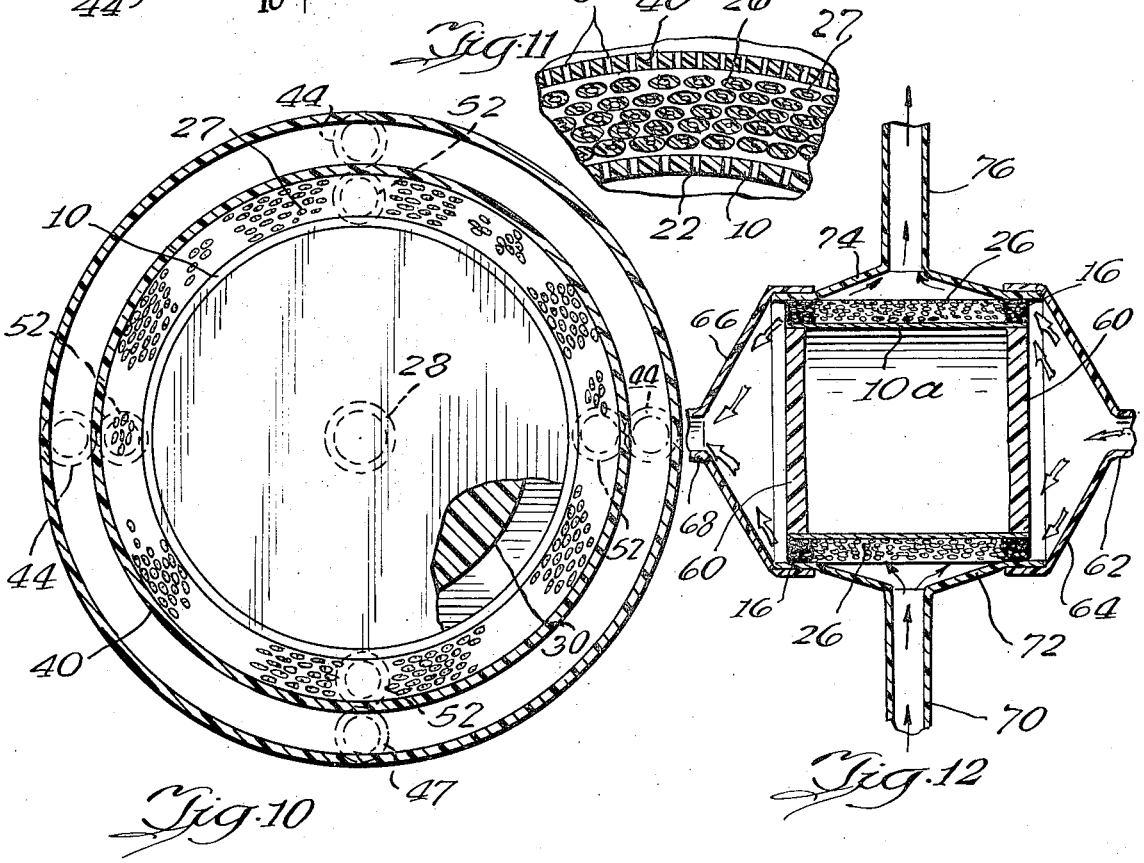

3,794,468
MASS TRANSFER DEVICE HAVING A WOUND TUBULAR DIFFUSION MEMBRANE
Ronald J. Leonard, Elk Grove Village, Ill., assignor to Baxter Laboratories, Inc., Morton Grove, Ill.
Filed Jan. 10, 1972, Ser. No. 216,669
Int. Cl. A61m 1/03; B01d 13/00
U.S. Cl. 23—258.5      13 Claims

ABSTRACT OF THE DISCLOSURE

A mass transfer device is made by winding a hollow tubular conduit of semi-permeable membrane about a core to form a multilayer winding of the conduit in which individual adjacent windings in the same layer are generally parallel to each other, but individual adjacent windings of the conduit in adjacent layers define an angle to each other. The ends of the core transverse to the tubular conduit windings are then potted with a curable sealant. After cure of the sealant, the ends of the wound core are cut transversely through medial portions of the cured sealant to sever the conduit into a plurality of individual conduit sections, the resulting sections being secured together at their ends by portions of the cured sealant, and having their hollow bores open to the exterior. Manifolds are then applied to provide one fluid flow path passing through the hollow bores of the conduit portions and anther fluid flow path percolating between the exteriors of the conduit portions.

BACKGROUND OF THE INVENTION

A number of designs for mass transfer devices using small capillary tubing made of semi-permeable membrane are known. Among these are U.S. Pats. 3,557,962 and 3,579,810.

The conventional method for assembling such devices usually involves the tedious task of placing and spacing individual lengths of semi-permeable tubing. This is a delicate and inconvenient operation since the lengths of tubing are generally small in diameter.

In accordance with this invention, a novel device is disclosed utilizing small diameter tubular semi-permeable membrane which provides excellent flow characteristics, for efficient mass transfer in a very small volume of space. The device is contemplated for use as an oxygenator of blood, an artificial kidney, a reverse osmosis apparatus, or any other mass transfer device. Furthermore, the device of this invention is easily manufactured on a commercial basis from a single strand of tubular membrane which is wound about a core as described below. The process is highly susceptible to automation, for reliability and low cost.

DESCRIPTION OF THE INVENTION

In accordance with this invention, a mass transfer device is provided which comprises a core and a plurality of layers of hollow tubular conduits of semipermeable membrane stacked one on another and supported by the core. The conduits extend from end to end of the core, the adjacent conduits of each individual layer being generally parallel to each other and the adjacent conduits of adjacent layers crossing each other at an angle. The exteriors of the conduits are encapsulated at opposite ends of the core by spaced bands of sealing material, but are open at the intermediate portions of the conduits. The conduits have open ends, so that a first manifold means can be provided for passing one fluid to an end of the core and from there through the bores of the conduits. Second manifold means are provided for passing another fluid between the conduits in contact with exterior conduit walls, for mass transfer between the two fluids.

The device of this invention can be readily assembled on an automated basis by simply winding a length of the hollow tubular conduit of semipermeable membrane about a core in a plane which defines an acute angle to the longitudinal axis and intersects both ends of the core. Simultaneously, the core is rotated about its longitudinal axis, or the plane of winding is correspondingly rotated to the same effect, to laterally displace on the core each winding of conduit from its immediately preceding winding. This results in a wound structure about the core similar to commercially available packages of kite string, in which the various layers of the parallel windings cross each other. In the device of this invention, this spontaneously provides flow channels through the wound mass of tubular membrane for easy, low-resistance flow of the fluid which is passed exterior of the tubular membrane.

Thereafter, the ends of the core transverse to the windings (i.e., the ends transverse to the longitudinal axis) are potted with a curable sealant, which is then allowed to cure. The unitary mass of sealant at each end is then cut transversely to the longitudinal axis between the aforesaid core ends through a middle portion of each mass of sealant. The result of this is to sever the conduit into a large plurality of individual conduit sections, which sections remain secured together at their ends by the remaining portions of the unitary mass of cured sealant at each end of the core. Likewise, by this action, the hollow bores of each of the conduit sections are opened to the exterior.

Thereafter, appropriate manifolds are provided to permit the sealed passage of one fluid through the bores of the tubular conduit sections, for mass transfer with a second fluid which is passed through the crossing network of conduit sections in contact with the exterior of the conduit sections, for efficient mass transfer between the two fluids.

In the drawings, FIG. 1 is a front perspective view of a cylindrical core used in this invention in the process of being wound with a single filament of tubular mass transfer membrane in accordance with the teachings of this invention.

FIG. 2 is a back perspective view of a core in a later stage of the winding.

FIG. 3 is a perspective view of the wound core with potted ends.

FIG. 4 is a perspective view of the wound core after transverse cutting of the potted ends.

FIG. 5 is a highly detailed view showing the arrangements of the tubular strands of semipermeable membrane as they lie on the core after winding in accordance with the principles of this invention.

FIG. 6 is a sectional view of the wound, potted core of this invention.

FIG. 7 is a sectional view of the core of FIG. 6 after the ends thereof have been transversely cut to create a large plurality of semipermeable membrane sections, the bores of which are exposed to the exterior.

FIG. 8 is a sectional view of the mass transfer device of this invention with manifold means added.

FIG. 9 is a perspective view of the device of FIG. 8.

FIG. 10 is a sectional view taken along line 10—10 of FIG. 8.

FIG. 11 is a highly magnified sectional end view of a portion of FIG. 10 showing transverse views of the semipermeable membrane sections.

FIG. 12 is a sectional view of another embodiment of the device of this invention.

FIG. 13 is a transverse sectional view of the device shown in FIG. 12.

Referring to FIG. 1, the porous cylindrical core 10 is shown with a length of semipermeable capillary tubing 11 attached to core 10 at one end on the inside as indicated at 12. Tubing 11 is then wound about the core 10 with a circular motion occupying plane A—A, while core 10 is slowly rotated as indicateed by the rotational arrow about longitudinal axis X—X by mounting on shaft 13, having an expansible chuck 15 within the bore 20 of cylindrical core 10, so that each individual winding 14 of conduit 11 is laterally spaced from its neighbor windings. When core 10 has been rotated 180° about axis X—X, it will be completely surrounded with windings of conduit 11, and further rotation will cause a second layer of windings 17 of conduit 11 (FIG. 2) to form on top of the first windings 14. These latter windings 17 will be disposed at an angle to windings 14, and will be completed when core 10 has rotated a second 180°. Upon further rotation, a third layer of windings is formed and then a fourth layer, and so on. When the desired number of layers of windings have been produced, a structure as shown in FIG. 3 is produced by potting the ends 16 of the core transverse to the tubular conduit windings and to axis X—X with a curable sealant, leaving a substantial space 18 between the bands of sealant 16. Prior to this, the second end of conduit 11 can be placed inside the bore 20 of core 10 and sealed to the wall of core 10 in the manner similar to that shown at 12, or sealed in a band 16 of sealant.

The angle of plane A—A and axis X—X is preferably from 10° to 50°, and core 10 is preferably rotated about 2° to 10° per single winding of the tubular conduit.

Alternatively, layers of sealing can be continuously applied as the core is wound to provide an improved seal of all strand windings. Preferably, quick sealants are used in this instance.

In FIGS. 3 and 4 the multiple crossing layers of tubing 11 are shown only in diagrammatic manner, with extra layers eliminated for purposes of clarity.

After curing of the sealant, a longitudinal section of core 10 appears as in FIG. 6. Core 10 is shown as a cylindrical section having pores 22 to permit fluid flow through the core. The windings of tubing 11 are shown to run at an angle to the plane of the cross section, but it should be noted that they run from end to end of the of the core, as indicated in FIG. 3. The potting bands 16 at the ends of the core throughly encase the wound conduit 11 and provide a fluid tight seal with core 10.

Referring to FIG. 5, a magnified view of the first set of windings 14 and the second set of windings 17 is shown in magnified form, to show how the individual adjacent windings of conduit in the same layer are generally parallel to each other, and individual adjacent windings of conduit in adjacent layers define an angle to each other. When wound in accordance to the method described above, any number of strand layers are provided with the alternating angular orientation to provide a structure as shown but in any desired thickness. This alternating layer arrangement provides flow channels for fluid on the exterior of conduit 11 having a very low resistance and highly desirable flow characteristics without the use of spacers between the windings of conduit 11.

FIGS. 4 and 7 show how the ends transverse to the conduit windings are cut after curing of sealant bands 16 to leave portions 24 of sealant bands 16 in place to secure the longitudinally extending individual conduit sections 26 created by the cutting operation. Simultaneously, the cutting operation opens the individual conduit sections 26 at each end to provide a plurality of flow channels through the bores 27 of sections 26 running longitudinally of core 10.

An end view of the conduit sections 26 is shown in FIG. 11 in detailed view.

Referring to FIGS. 8 through 11, the structure produced by the cutting operation as shown in FIGS. 4 and 7 is surrounded by manifolds to provide a pair of independent flow paths, one passing through the bores 27 of the conduit sections 26, and the other passing exterior of the conduit sections 26 through the crossed and overlapping layers 14 and 17 (FIG. 2) for mass transfer between the two fluids in cross current flowing relation. A plug section 29 having an integral inlet tubing 28 is provided for what in the specific embodiment shown can be a blood inlet to the device. Blood passes in tubing 28 and is deflected by large insert 30, which is typically a cup-shaped or otherwise hollow structure with a closed end pointing toward tubing 28, to provide a thin, disc-shaped flow channel 32 for blood leading to a cylindrical flow channel 34. At this point, the blood passes through holes 22 of core 10, and then percolates about the longitudinally extending conduit sections 26 to engage in mass transfer with oxygen passing through the bores 27 of sections 26, to expel carbon dioxide into the sections 26 and to take up oxygen therefrom.

In this embodiment, the initial capillary tubing 11 and the resulting conduits 26 can preferably be made of thin-walled silicon rubber, or porous polytetrafluorethylene having a pore size of less than 1 micron. A preferred tubing size is an inner diameter of about 0.01 inch and a wall thickness of about 0.005 inch. If the device is intended to be a dialyzer for blood, other suitable capillary tubing materials are presently in commercial use for the purpose.

Following such mass transfer, the blood passes through pores 38 of a second cylindrical core 40 into a cylindrical outlet conduit 42, having a plurality of outlet tubes 44 for return of the blood to the body of the patient.

Similarly, manifold means are present to provide the distribution of oxygen from an oxygen line 47 for conveying the oxygen into a circular manifold 48 which communicates with the bores of conduit sections 26. From there, oxygen flows through the conduit sections into a circular collection manifold 50 and a plurality of outlets 52.

Referring to FIG. 12, an alternate embodiment of the mass transfer device of this invention is shown having the advantage that each inlet and outlet comprises a single tubular conduit, for convenience of construction and use. Conduit sections 26 of tubular semipermeable membrane are wound on a fluid impermeable core 10a in the manner described above, being maintained on a core 10a by bands of sealant 16. The bore of impermeable core 10a is sealed by plugs 60 at each end. First manifold means are provided comprising an inlet tube 62, typically for oxygen, which communicates with distribution chamber 64 to pass the oxygen or other fluid to one end of core 10a and through the bores of conduits 26 for mass transfer.

A first collection means is provided comprising a chamber 66 for receiving the spent oxygen or other fluid after mass transfer from the other ends of bores 26 and for conveying it to outlet 68. Second manifold means are also provided for blood or another fluid comprising inlet 70 and a distribution chamber 72 for distributing the blood uniformly across the lengths of a portion of adjacent tubular conduits extending between the spaced ends of sealant 16. While shown to be wide, extending between the sealant bands 16, chamber 72 is relatively narrow in its transverse dimention (FIG. 13), so that only a thin longitudinal section of core 10a is covered by the chamber 72, although chamber 72 extends essentially the length of core 10a. By this arrangement, blood is uniformly distributed across the length of the core 10a.

From there, the blood passes circumferentially about the core 10a through the layers of conduits 26 for mass transfer with the oxygen or other fluid in the interior of the conduits, being encased by casing 73. After the blood has passed circumferentially 180° about core 10a, it is picked up by second collection means, which comprises collection chamber 74, which also extends the length of a portion of adjacent conduits between the bands of sealing material 16, and is conveyed away by conduit 76. In passing from chamber 72 to 74, the blood flow path divides, and passes in opposite directions circumferentially around cylindrical core 10a between conduits 26, rejoining again at chamber 74 for collection.

In any of the devices of this invention, the blood can pass within the bores of the tubular conduits and oxygen or dialysis solution can pass about the exteriors thereof.

The above is offered for illustrative purposes only, and is not intended to limit the invention of this application, which is defined in the claims below.

That which is claimed is:

1. A mass transfer device which comprises a core, a plurality of layers of hollow, tubular conduits of semipermeable membrane stacked one on another, with all adjacent layers being in direct contact with each other, and supported by said core on an external surface thereof, said conduits extending directly from end to end of said core, each individual layer having a plurality of separate adjacent conduits disposed generally parallel to each other, and the adjacent conduits of adjacent layers crossing each other at an angle, the exteriors of said conduits being encapsulated by spaced bands of sealing material at opposite ends of said core, said conduits having open ends, and first manifold means for passing one fluid to an end of said core and through said conduits in contact with interior conduit walls, and second manifold means for passing another fluid through said layers of conduits in contact with exterior conduit walls between the ends of said core.

2. The mass transfer device of claim 1 in which said first manifold means carries oxygen and said second manifold means carries blood.

3. The device of claim 2 in which the flow paths of oxygen and blood through said mass transfer device are generally cross-current to each other.

4. A mass transfer device which comprises a porous, fluid-permeable core, a plurality of layers of hollow, tubular conduits of semipermeable membrane stacked one on another and supported by said core on an external surface thereof, said conduits extending directly from end to end of said core, the adjacent conduits of each individual layer being generally parallel to each other, and the adjacent conduits of adjacent layers crossing each other at an angle and laying in direct contact with each other, the exterior extremities of said conduits being encapsulated by spaced bands of sealing material at opposite ends of said core, said conduits having bores with open ends, first delivery means to provide a separate, sealed fluid flow path to the bores at one end of said tubular conduits, second delivery means to provide a sealed fluid flow path into and within said core communicating through said core with the exterior surfaces of said conduits, first collection means for receiving spent fluid from the other end of said conduit bores and for conveying said fluid away from said device, and second collection means to collect fluid passing through the core and conduit layers, and for conveying said fluid away from the device.

5. The device of claim 4 in which said first delivery means comprises a disc-like manifold communicating with said one end of the bores of the hollow tubular conduits disposed about said core.

6. The device of claim 5 further comprising means forming a cup-shaped manifold space within said core, said space being sealed to prevent fluid communication with the interiors of said conduits and to permit fluid communication with the exteriors of said conduits, and in which said second delivery means comprises a single inlet tube communicating with said cup-shaped manifold space whereby fluid is uniformly distributed along exposed portions of hollow tubular conduit exteriors.

7. The device of claim 6 in which said first delivery means receives oxygen and said second delivery means receives blood.

8. A mass transfer device which comprises a fluid impermeable core closed at both ends, a plurality of layers of hollow tubular conduits of semipermeable membrane stacked one on another and supported by said core on an external surface thereof, said conduits extending from end to end of said core, the adjacent conduits of each individual layer being generally parallel to each other, and the adjacent conduits of adjacent layers crossing each other at an angle, the exterior extremities of said conduits being encapsulated by spaced bands of sealing material at opposite ends of said core, said conduits having bores with open ends, and first manifold means which comprises an inlet tube and a distribution chamber to pass a first fluid to one end of said core and through the bores of said conduits at said one end; first collection means comprising a chamber for receiving spent first fluid from the other end of said conduit bores and for conveying it away; second manifold means comprising a second fluid inlet and a distribution chamber for distributing said second fluid uniformly across the exterior lengths of adjacent conduits extending between said spaced bands of sealing material, to allow a second fluid to pass circumferentially about said core through said layers of conduits for mass transfer with the first fluid in the bores of said conduits; and second collection means comprising a collection chamber extending the length of a portion of adjacent conduits extending between said spaced bands of sealing material on the opposite side of said core from said second manifold means, for collecting the second fluid, and for conveying it away.

9. The mass transfer device of claim 8 in which said first fluid is oxygen and second fluid is blood.

10. The mass transfer device of claim 8 in which said adjacent conduits of adjacent layers are in direct contact with each other, and each individual conduit winding extends directly from end to end of said core.

11. In a method of assembling a mass transfer device, the improvement comprising:
   winding a continuous hollow tubular conduit of semipermeable material on a core in a plane which defines an acute angle to the longitudinal axis of said core and intersects the ends of said core, while relatively rotating said core about its longitudinal axis with respect to said plane, to laterally displace each winding of said conduit from its immediately preceding winding, to form a multilayer winding of said conduit in which individual adjacent windings of said conduit in the same layer are generally parallel to each other, and individual adjacent windings of said conduit in adjacent layers define an angle with each other;
   potting the ends of said core transverse to said tubular conduit windings with a curable sealant;
   curing said sealant at each end to a unitary mass; and
   cutting transversely to the axis between said core ends through a medial portion of each said unitary mass at each core end to sever said conduit windings into a plurality of individual conduit sections, said sections being secured together at their ends by portions of said unitary mass, and having their hollow bores open to the exterior.

12. The method of claim 11 in which said acute angle is from 10° to 50°, and said core is rotated from 2° to 10° about its longitudinal axis per winding of the tubular conduit.

13. The method of claim 12 in which manifolds are installed to define a first fluid flow path through the hollow bores of said individual conduit sections, and a separate, second fluid flow path about the exterior surfaces of said individual conduit sections.

References Cited

UNITED STATES PATENTS

| | | | |
|---|---|---|---|
| 3,198,335 | 8/1965 | Lewis et al. | 210—321 |
| 3,373,876 | 3/1968 | Stewart | 23—258.5 X |
| 3,422,008 | 1/1969 | McLain | 210—497.1 X |
| 3,485,902 | 12/1969 | Critchell | 210—321 X |
| 3,536,611 | 10/1970 | De Filippi et al. | 210—321 X |
| 3,579,810 | 5/1971 | Mori | 23—258.5 X |
| 3,690,465 | 9/1972 | McGuinnis et al. | 210—321 |

BARRY S. RICHMAN, Primary Examiner

U.S. Cl. X.R.

55—158; 128—DIG. 3; 210—321, 497.1